(12) United States Patent
Jeschke et al.

(10) Patent No.: US 8,816,918 B2
(45) Date of Patent: Aug. 26, 2014

(54) ANTENNA ARRAY IN A MOTOR VEHICLE

(75) Inventors: Markus Jeschke, Ingolstadt (DE);
Christoph Ullrich, Ingolstadt (DE);
Eckhard Gerlemann, Ingolstadt (DE);
Mareen Koehler, Theissing (DE)

(73) Assignee: Audi AG, Ingolstadt (DE)

( * ) Notice: Subject to any disclaimer, the term of this patent is extended or adjusted under 35 U.S.C. 154(b) by 0 days.

(21) Appl. No.: 14/003,119

(22) PCT Filed: Jul. 16, 2011

(86) PCT No.: PCT/EP2011/003560
§ 371 (c)(1),
(2), (4) Date: Nov. 7, 2013

(87) PCT Pub. No.: WO2012/119619
PCT Pub. Date: Sep. 13, 2012

(65) Prior Publication Data
US 2014/0062809 A1    Mar. 6, 2014

(30) Foreign Application Priority Data
Mar. 4, 2011  (DE) .......................... 10 2011 012 963

(51) Int. Cl.
*H01Q 1/32*  (2006.01)
*H01Q 1/38*  (2006.01)
*H01Q 13/10* (2006.01)
*B60J 10/10* (2006.01)
*H01Q 9/30*  (2006.01)

(52) U.S. Cl.
CPC .............. *H01Q 1/3283* (2013.01); *H01Q 1/38* (2013.01); *H01Q 1/3291* (2013.01); *H01Q 13/10* (2013.01); *B60J 10/10* (2013.01); *H01Q 9/30* (2013.01)
USPC ............................ 343/713; 343/711; 343/767

(58) Field of Classification Search
USPC .................................. 343/711, 712, 713, 767
See application file for complete search history.

(56) References Cited

U.S. PATENT DOCUMENTS 2,575,471 A    11/1951  Schweiss et al.
4,707,700 A *  11/1987  Nagy ............................ 343/712
(Continued)

FOREIGN PATENT DOCUMENTS

DE    4125898     2/1993
DE    19942038    10/2000
(Continued)

OTHER PUBLICATIONS

English language International Search Report for PCT/EP2011/003560, mailed Nov. 4, 2011, 2 pages.
(Continued)

*Primary Examiner* — Dieu H Duong
(74) *Attorney, Agent, or Firm* — Staas & Halsey LLP

(57) ABSTRACT

An antenna array for a motor vehicle has at least one seal which is composed of a nonconductive material and has an antenna which is mounted in the region of a sealing face of the seal and has the purpose of receiving radio signals. A convertible roof or sun roof or some other metallic vehicle part which is part of the antenna array can be positioned against the sealing face during the operation of the antenna and removed again. The antenna forms, with the metallic vehicle part which bears against the seal, the slot antenna which is effective between at least two metal faces. On the other hand, in the state in which no vehicle part bears against the seal, the antenna forms a flat electrical reception monopole which extends at a distance from a metal face which forms the antenna ground.

16 Claims, 4 Drawing Sheets

(56) References Cited

U.S. PATENT DOCUMENTS

| | | | |
|---|---|---|---|
| 4,758,166 A | 7/1988 | Bonnett et al. | |
| 5,177,494 A * | 1/1993 | Dorrie et al. | 343/711 |
| 5,629,712 A * | 5/1997 | Adrian et al. | 343/713 |
| 2005/0195116 A1 * | 9/2005 | Lotterer et al. | 343/713 |

FOREIGN PATENT DOCUMENTS

| | | |
|---|---|---|
| DE | 19921233 | 12/2000 |
| DE | 10039467 | 3/2002 |
| DE | 10139406 | 2/2003 |
| DE | 10250375 | 5/2003 |
| DE | 102004008973 | 9/2005 |
| DE | 102004035231 | 2/2006 |
| DE | 102007058247 | 6/2009 |
| DE | 102008057520 | 7/2009 |
| DE | 102011012963.4 | 3/2011 |
| EP | 0223398 | 5/1987 |
| EP | 0261762 | 3/1988 |
| EP | 0262755 | 4/1988 |
| EP | 1076375 | 2/2001 |
| EP | 1315629 | 6/2003 |
| FR | 1197127 | 11/1959 |
| WO | 2006/092188 | 9/2006 |
| WO | PCT/EP2011/003560 | 7/2011 |

OTHER PUBLICATIONS

English language Written Opinion of the International Searching Authority for PCT/EP2011/003560, downloaded from WIPO Sep. 4, 2013, 8 pages.

* cited by examiner

ANTENNA ARRAY IN A MOTOR VEHICLE

CROSS REFERENCE TO RELATED APPLICATIONS

This application is based on and hereby claims priority to International Application No. PCT/EP2011/003560 filed on Jul. 16, 2011 and German Application No. 10 2011 012 963.4 filed on Mar. 4, 2011, the contents of which are hereby incorporated by reference.

BACKGROUND

The invention relates to an antenna arrangement in a motor vehicle.

For aerodynamic reasons and also in order to protect against damage, antennas of motor vehicles can be integrated into door seals, sunroof seals or into other seals which are manufactured from an insulating material. DE 199 21 233 A1 discloses exemplary embodiments of such seals with a metal inlay which serves as an antenna for receiving electromagnetic waves. In these known embodiments, the antenna rests in a seal in an electrically insulated fashion, and the antenna seal is always operated in the same antenna mode, i.e. the antenna conductor and the return conductor or the ground are always operated in the same method of functioning. So that this same method of functioning is ensured even in the case of a sunroof seal independently of the state of opening, the antenna conductor and the return conductor which forms the antenna ground are integrated into the sunroof seal. These known sealing antennas are always operated in a mode in which there is a short distance between the antenna conductor and the antenna ground.

In order to obtain the highest possible antenna power for a vehicle antenna it is not advantageous if the distance between the antenna conductor and the antenna ground is very short.

SUMMARY

One possible object is providing an antenna arrangement in a motor vehicle with a seal which has an antenna function and which has the best possible reception properties.

The inventors propose an antenna arrangement that has at least one seal which is composed of a nonconductive material and has an antenna which is attached in the region of a sealing face of the seal and has the purpose of receiving radio signals. An electrically conductive vehicle part can be applied to the seal, wherein said part can be a convertible roof, a sunroof or some other preferably planar metal part. This planar metal part in conjunction with the antenna ground assumes the function of a slot antenna. If, on the other hand, such a vehicle part does not bear on the seal, the electrical conductor operates as a reception monopole. It is advantageous here that when the seal is not compressed the electrical conductor is at a maximum distance from the bodywork part to which the seal is attached and which preferably forms the antenna ground.

If the electrical conductor which serves as an antenna is provided on the seal, the metallic vehicle part preferably bears with a metallic contact face on the antenna, wherein there is then direct electrical contact with the antenna. A vehicle part which bears on the electrical conductor does not, however, necessarily have to have direct electrical contact with the conductor in order to be given the function of a slot antenna. If, for example, the surfaces of the applied vehicle part which form the contact point with the electrical conductor are electrically insulated from the electrical conductor by a surface coating and/or if the electrical conductor rests in the seal, a capacitive coupling is nevertheless produced between the electrical conductor and the vehicle part bearing thereon, for the received radio signals owing to their high frequencies.

In a further preferred embodiment there is provision that the seal has a c-shaped cross section and therefore an opening slot which extends in the longitudinal direction of the seal. In this embodiment, the narrow electrical conductor is located in the longitudinal direction of the seal, on the outside thereof facing away from the opening slot, as a result of which the electrical conductor is at a maximum distance from the opening slot which forms the attachment region of the rubber seal. Laterally opposite securing webs, with which the seal can be very easily inserted into a slot in a metal face, can protrude from the opening slot.

The proposed antenna device can basically be applied in seals with very different profiles, such as, for example, even in hose-shaped seals.

The effective sealing face of the seal is preferably broader than the electrical conductor, in order to ensure that the sealing function of the seal is not adversely affected by the electrical conductor. It is advantageous here if the electrical conductor which is attached to the seal is printed on as a very thin conductor track or bonded on as a thin metal foil.

The antenna arrangement is preferably embodied in such a way that the seal forms, with the electrical conductor, one of two or more vehicle antennas which are part of an antenna diversity system. A diversity system for a vehicle is described in EP 1 076 375 A3. By using such a diversity system it is possible to achieve optimization of the reception signals which are made available to the respective receiver device if reception signals are available from two or more vehicle antennas. In the present case, the diversity system is, in particular, also provided for detecting the change in the reception characteristic which occurs when a vehicle part is applied to the seal or to the electrical conductor on the seal or if a vehicle part is removed from the seal or from the electrical conductor. In this case, the diversity system can select the respectively best possible reception signal of the entire antenna arrangement and pass it on to a radio receiver in the vehicle.

BRIEF DESCRIPTION OF THE DRAWINGS

These and other objects and advantages of the present invention will become more apparent and more readily appreciated from the following description of the preferred embodiments, taken in conjunction with the accompanying drawings of which.

DETAILED DESCRIPTION OF THE PREFERRED EMBODIMENT

Figure 1:
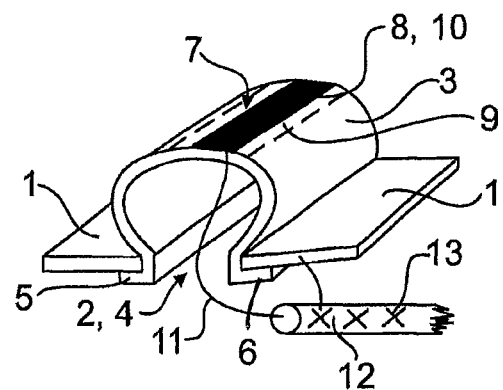
FIG. 1 shows the arrangement of an electrical conductor which serves as an antenna, on an elastic, uncompressed seal.

Reference will now be made in detail to the preferred embodiments of the present invention, examples of which are illustrated in the accompanying drawings, wherein like reference numerals refer to like elements throughout.

The detail of a metal face 1 (illustrated in FIG. 1) of a vehicle is provided with a longitudinal slot 2 in which an elastic seal 3 which is composed of nonconductive material engages. For this purpose, securing webs 5, 6 which protrude laterally from an opening slot 4 extending in the longitudinal direction of the seal 3 are integrally formed on the seal 3, which, like the metal face 1, is illustrated only in part here. In this way, the seal 3 can be securely inserted into the slot 2 in the metal face 1.

On the outside 7 lying opposite the longitudinal slot 4, an electrical conductor 8 is provided on the seal 3 in the region of the sealing face 9. The lateral boundary of the sealing face 9 is indicated by unbroken lines.

Figure 6:
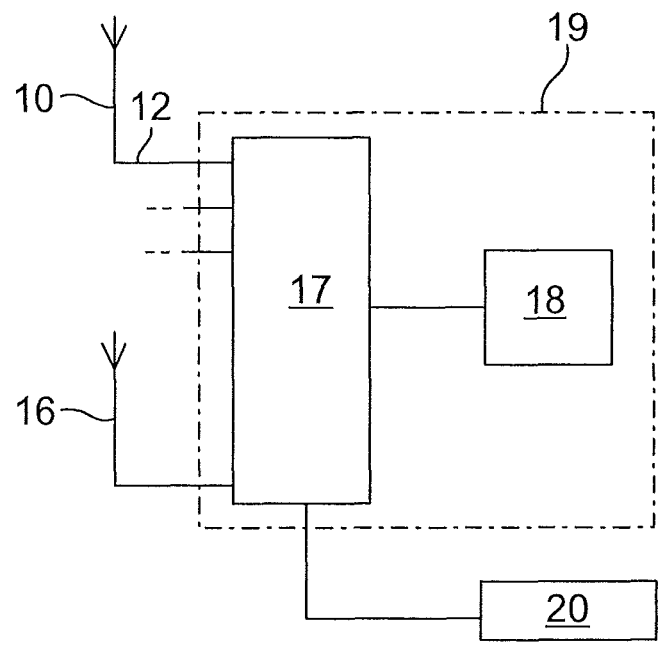
FIG. 6 shows a schematically illustrated design of an antenna diversity system.

The electrical conductor 8 has the function of an antenna 10 and is, for this purpose, connected to the antenna conductor 11 of a coaxial cable 12 whose metallic sleeve 13 is electrically connected as an antenna ground to the metallic face 1. The coaxial cable 12 can be connected to an antenna diversity system as is illustrated in FIG. 6.

Figure 2:
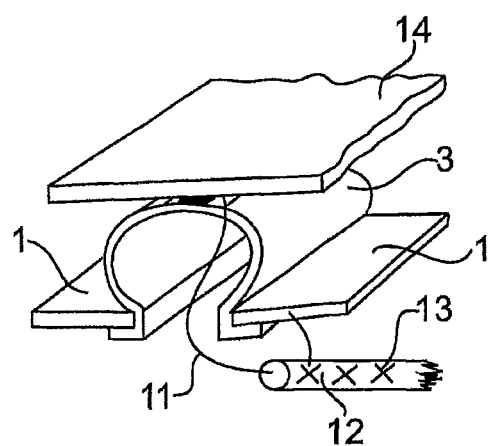
FIG. 2 shows the seal from FIG. 1, but in the slightly compressed state when a metallic vehicle part is applied.

FIG. 2 then shows the seal 3 from FIG. 1 with a metallic vehicle part 14 which bears on the electrical conductor 8 and on the sealing face 9 which extends laterally next to the latter, said vehicle part 14 being, for example, part of a convertible roof here. As a result of the seal-forming bearing of the vehicle part 14 on the seal 3, the latter is somewhat depressed or compressed, with the result that not only the electrical conductor 8 but also the sealing face 9 adjoining it comes to bear on the vehicle part 14. In this case, there is a direct or at least capacitive electrical connection between the electrical conductor 8 and the vehicle part 14, with the result that in conjunction with the metal face 1, the metallic vehicle part 14 forms a slot antenna which is effective in the edge region between the metal face 1 and the vehicle part 14. When the vehicle part 14 is in contact with the electrical conductor 8 which is preferably printed onto the seal 3, the surface currents of the conductive vehicle part 14 are then tapped via the coaxial cable 12.

The reception characteristic of the antenna arrangement in FIG. 1 therefore differs from that in FIG. 2, which is achieved, on the one hand, by an opened convertible roof in the case of FIG. 1 and, on the other hand, by a closed convertible roof in the case of FIG. 2.

Figure 3:
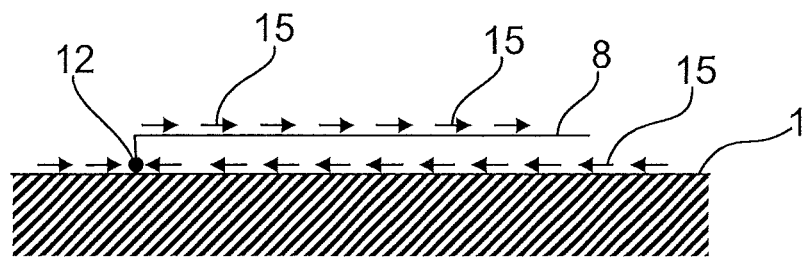
FIG. 3 shows the power distribution in an antenna arrangement which operates as a reception monopole.

FIG. 3 illustrates schematically the power distribution of the antenna which operates as a reception monopole according to FIG. 1, wherein the power intensity is indicated by direction arrows 15 of different lengths. The electrical conductor 8 is illustrated as an antenna wire which runs parallel to the metallic face 1 and is connected to the coaxial cable 12 according to FIG. 1.

Figure 4:
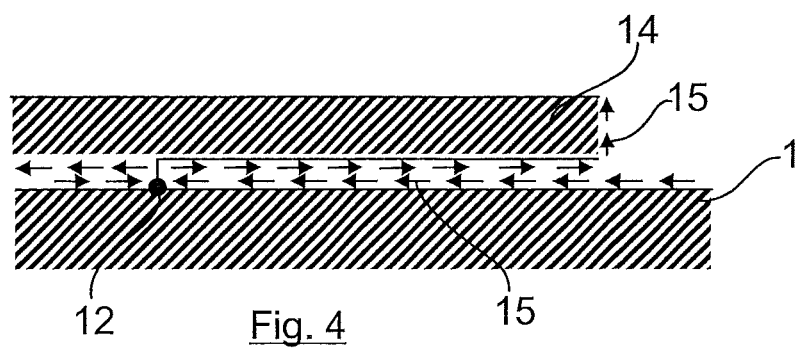
FIG. 4 shows the power distribution of an antenna arrangement which operates as a slot antenna.

FIG. 4 illustrates the principle of the slot antenna which emerges from the arrangement in FIG. 2. The metallic vehicle part 14, which is, for example, a metallic convertible roof, is located at a short slot distance from the metallic face 1, which is formed, for example, by frame parts of the motor vehicle. The power distribution which results here as a result of an incident electromagnetic wave is also indicated here by direction arrows 15, and the antenna signal is tapped via the coaxial cable 12. The surface currents, indicated by the direction arrows 15, at the vehicle part 14 are tapped via the coaxial cable 12 and can be used as a reception signal.

Figure 5:
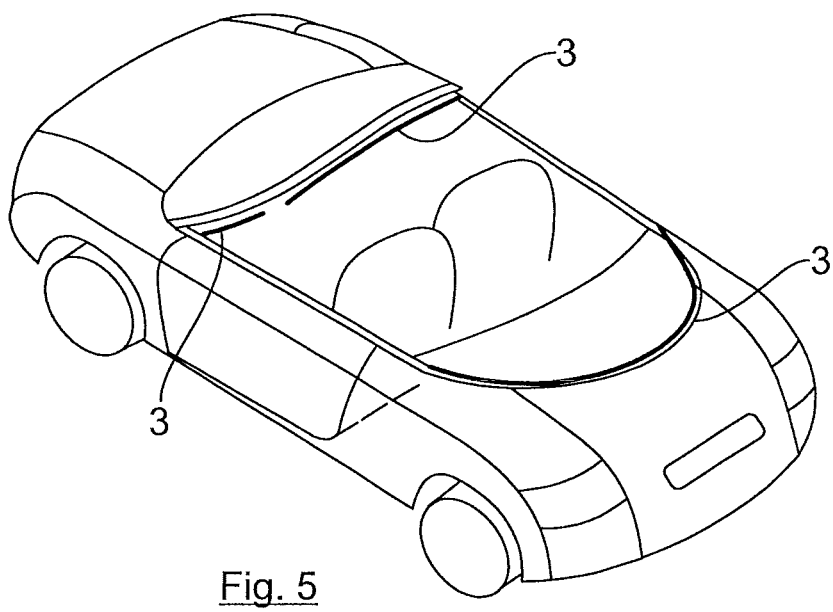
FIG. 5 shows a vehicle on which the seal is arranged with an electrical conductor provided for providing a seal with respect to a convertible roof.

The illustration in FIG. 5 shows a motor vehicle with opened convertible roof, in which a seal 3 is, as is illustrated in FIG. 1, attached at a plurality of points. The seals 3 can be connected to an antenna diversity system such as illustrated in FIG. 6. Preferably further vehicle antennas are connected to the antenna diversity system 19 in order to be able to select the respective optimum reception signal of one of the antennas used, in order to optimize the radio reception. For example, a window antenna 16 can be used as one of the further antennas. All the antennas 10, 16 of the vehicle are connected to an evaluation device 18 of the antenna diversity system 19 via a switching device 17. The evaluation device 18 selects the optimum reception signal from all the possible reception signals and connects it through to a radio receiver 20 via the switching device 17.

The antenna diversity system 19 also detects here the change in the reception characteristic of the sealing antennas with the electrical conductor 8 which is located on the seal 3 if the latter operate, on the one hand, as a reception monopole when the convertible roof is opened, and, on the other hand, as a slot antenna when the convertible roof is closed. When a change is detected in the antenna characteristic, it is then possible, where necessary, for the antenna diversity system 19 to switch over in order to ensure optimum radio reception.

The illustrated exemplary embodiment according to FIG. 5 shows the use of the seal with an antenna function on a vehicle with a convertible roof. However, such seals can also be used in the region of the sunroof or in the region of other closure parts on the motor vehicle.

Figure 7:
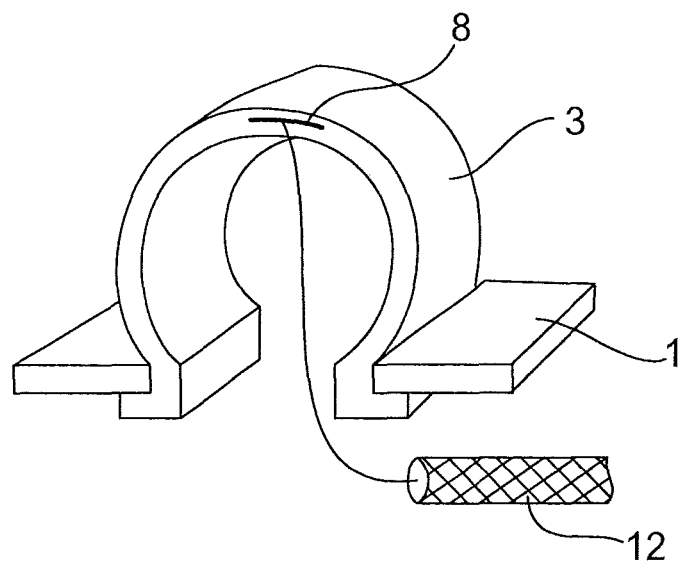
FIG. 7 shows the arrangement of an electrical conductor, serving as an antenna, in a seal.
Figure 8:
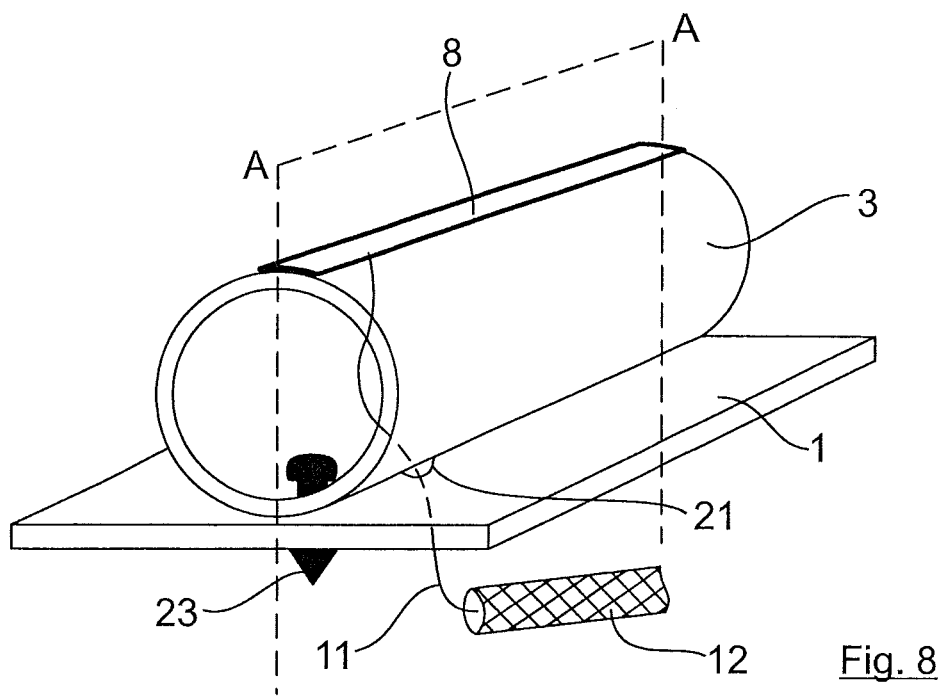
FIG. 8 shows the arrangement of an electrical conductor, serving as an antenna, on a hose-shaped seal.
Figure 9:
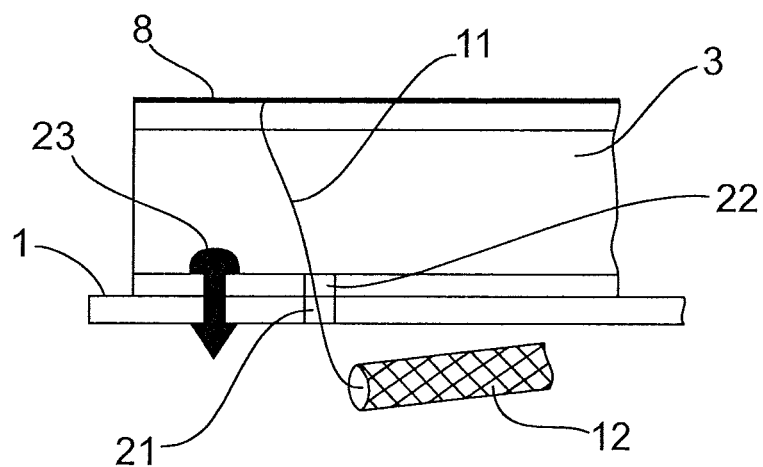
FIG. 9 shows the longitudinal section according to the sectional plane AA of the arrangement in FIG. 8.

FIGS. 7 to 9 illustrate further embodiments of seals, wherein in FIG. 7 the electrical conductor 8 rests in the sealing material of the seal 3, and in contrast in FIG. 8 and FIG. 9 a hose-shaped seal 3 with an electrical conductor 8 which is provided on the sealing face is illustrated.

In the hose-shaped seal 3 in FIG. 8 and FIG. 9, the antenna conductor 11 is guided through corresponding holes 21, 22 in the metal face 1 and the seal 3. The seal 3 can be attached to the metal face 1 by a plurality of attachment elements, one pin-shaped attachment element 23 of which is illustrated by way of example.

The invention has been described in detail with particular reference to preferred embodiments thereof and examples, but it will be understood that variations and modifications can be effected within the spirit and scope of the invention covered by the claims which may include the phrase "at least one of A, B and C" as an alternative expression that means one or more of A, B and C may be used, contrary to the holding in Superguide V. DIRECTV, 69 USPQ2d 1865 (Fed. Cir. 2004).

The invention claimed is:

1. An antenna device in a motor vehicle, comprising:
an antenna to receive radio signals, the antenna comprising a metallic conductor, the antenna being grounded in a first metal face; and
a seal formed of a nonconductive material, the seal having a sealing face to receive a metallic vehicle part, the metallic vehicle part having a second metal face, the metallic vehicle part being selected from the group consisting of a convertible roof, a sunroof and another automotive part, the sealing face receiving the metallic vehicle part such that the metallic vehicle part can be applied to and removed from the sealing face during operation of the antenna, wherein when the metallic vehicle part bears on the sealing face, the antenna is formed as a slot antenna between the first and second metal faces, and when the metallic vehicle part does not bear on the metallic conductor, the antenna is formed as a flat electrical reception monopole which extends a distance from the first metal face.

2. The antenna device as claimed in claim 1, wherein the metallic conductor is an electrical conductor provided on the sealing face of the seal, such that when the metallic vehicle part is applied to the sealing face, the metallic vehicle part bears on the electrical conductor.

3. The antenna device as claimed in claim 2, wherein the electrical conductor is printed or bonded onto the seal.

4. The antenna device as claimed in claim 2, wherein the electrical conductor is a metallic foil provided on the seal.

5. The antenna device as claimed in claim 1, wherein
the seal is formed of a sealing material,
the metallic conductor is an electrical conductor in the sealing material, and
when the metallic vehicle part is applied to the sealing face, the metallic vehicle part is coupled capacitively to the electrical conductor.

6. The antenna device as claimed in claim 5, wherein
the seal has a c-shaped cross section with an opening slot which extends in a longitudinal direction of the seal, and
the metallic conductor is embedded in the sealing material at a position displaced from the opening slot.

7. The antenna device as claimed in claim 1, wherein
the seal has a c-shaped cross section with an opening slot which extends in a longitudinal direction of the seal, and
the metallic conductor is an electrical conductor that extends in the longitudinal direction of the seal, and
the metallic conductor is provided on an outside of the seal, facing away from the opening slot.

8. The antenna device as claimed in claim 1, wherein the seal is a hose-shaped seal.

9. The antenna device as claimed in claim 8, wherein the metallic conductor connects to an antenna conductor of a coaxial cable through correspondingly positioned holes in the hose-shaped seal and the first metal face.

10. The antenna device as claimed in claim 1, wherein
when the metallic vehicle part is applied to the sealing face, a portion of the sealing face directly receives the metallic vehicle part, and
the portion of the sealing face that directly receives the metallic vehicle part is broader than the metallic conductor.

11. The antenna device as claimed in claim 1, wherein
the antenna device is an antenna diversity system having a plurality of antenna elements, and
the seal and the metallic conductor are part of a first antenna element of the plurality of antenna elements.

12. The antenna device as claimed in claim 11, wherein
the first antenna element has antenna characteristics that change when the metallic vehicle part is applied to and removed from the sealing face, and
an evaluation device detects that the antenna characteristics of the first antenna element have changed.

13. The antenna device as claimed in claim 12, wherein a switching device switches between the plurality of antenna elements based on antenna characteristics detected by the evaluation device.

14. The antenna device as claimed in claim 1, wherein
the metallic conductor connects to an antenna conductor of a coaxial cable, and
the first metal face connects to a sheath of the coaxial cable.

15. The antenna device as claimed in claim 1, wherein
the seal is formed of a resilient material,
when the metallic vehicle part is applied to the sealing face, the sealing face is compressed toward the first metal face, and
when the metallic vehicle part is removed from the sealing face, the sealing face springs away from the first metal face to increase the distance of the flat electrical reception monopole from the first metal face.

16. The antenna device as claimed in claim 1, wherein the first metal face is formed on a panel of the motor vehicle.

* * * * *